UNITED STATES PATENT OFFICE.

OTTO BONHOEFFER, OF ELBERFELD, GERMANY, ASSIGNOR TO THE FARBENFABRIKEN OF ELBERFELD CO., OF NEW YORK, N. Y.

DIETHYLCARBINOLURETHANE AND PROCESS OF MAKING SAME.

SPECIFICATION forming part of Letters Patent No. 675,538, dated June 4, 1901.

Application filed October 23, 1899. Serial No. 734,542. (Specimens.)

*To all whom it may concern:*

Be it known that I, OTTO BONHOEFFER, doctor of philosophy and chemist, of Elberfeld, Germany, (assignor to the FARBENFABRIKEN OF ELBERFELD COMPANY, of New York,) have invented a new and useful Improvement in the Manufacture of Pharmaceutical Compounds, of which the following is a specification.

My invention relates to the preparation of a new pharmaceutical product which is chemically diethylcarbinolurethane or carbamic ether of diethylcarbinol having the formula

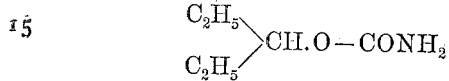

and which possesses valuable therapeutic, especially soporific, properties.

The process for producing my new compound consists in allowing urea or salts thereof to act on diethylcarbinol in a suitable manner.

In order to carry out my process practically, I can, for instance, proceed as follows: Ten parts, by weight, of diethylcarbinol are mixed with fourteen parts, by weight, of urea nitrate or with the corresponding quantity of urea, and the resulting mixture is heated in a closed vessel under pressure for, say, five hours at from about 125° to 130° centigrade. After cooling the mass is extracted with ether or benzene, and the so-obtained solution is then evaporated. The residue remaining therefrom represents the diethylcarbinolurethane. When crystallized from water, it forms small white needles melting at from 112° to 113° centigrade. It is readily soluble in alcohol, benzene, ether, and in hot ligroin, also soluble in water.

According to my investigations the new compound possesses valuable therapeutic properties and can be used in medicine as a soporific, an average dose being between two and three grams.

Having now described my invention and in what manner the same is to be performed, what I claim as new, and desire to secure by Letters Patent, is—

1. The process for the production of diethylcarbinolurethane which process consists in causing urea nitrate to act on diethylcarbinol, isolating the so-formed diethylcarbinolurethane and subsequently purifying the same, substantially as hereinbefore described.

2. As a new article of manufacture the diethylcarbinolurethane having the formula

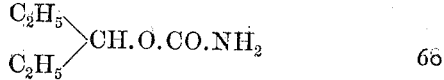

forming when crystallized from water small white needles melting at from 112° to 113° centigrade being readily soluble in alcohol, benzene, ether and in hot ligroin, also soluble in water and adapted for being used in medicine as soporific, substantially as hereinbefore described.

In testimony whereof I have signed my name in the presence of two subscribing witnesses.

OTTO BONHOEFFER.

Witnesses:
  R. E. JAHN,
  OTTO KÖNIG.